US011160418B1

(12) United States Patent
Parrish et al.

(10) Patent No.: US 11,160,418 B1
(45) Date of Patent: Nov. 2, 2021

(54) BARBECUE GRILL ACCESSORY AND METHOD FOR PREPARING FOOD

(71) Applicant: Adrenaline Barbecue Company, LLC, Concord, NC (US)

(72) Inventors: Michael David Parrish, Concord, NC (US); Aaron Michael Lyons, Farwell, MI (US)

(73) Assignee: Adrenaline Barbecue Company, LLC, Concord, NC (US)

( * ) Notice: Subject to any disclaimer, the term of this patent is extended or adjusted under 35 U.S.C. 154(b) by 222 days.

(21) Appl. No.: 16/526,318

(22) Filed: Jul. 30, 2019

Related U.S. Application Data

(63) Continuation of application No. 14/996,982, filed on Jan. 15, 2016, now Pat. No. 10,362,899.

(60) Provisional application No. 62/133,050, filed on Mar. 13, 2015.

(51) Int. Cl.
*A47J 37/07* (2006.01)
*A23L 5/10* (2016.01)

(52) U.S. Cl.
CPC .............. *A47J 37/0786* (2013.01); *A23L 5/15* (2016.08)

(58) Field of Classification Search
CPC ........ A47J 37/0786; A47J 36/16; A47J 37/07; B65D 25/04
See application file for complete search history.

(56) References Cited

U.S. PATENT DOCUMENTS

| | | | | | |
|---|---|---|---|---|---|
| 1,432,335 | A | * | 10/1922 | Allen ...................... | F24C 13/00 126/344 |
| 1,591,491 | A | * | 7/1926 | Judge ................... | B01D 29/085 210/472 |
| 1,613,671 | A | * | 1/1927 | O'Donnell .............. | A47J 27/10 220/573.4 |
| 1,973,202 | A | * | 9/1934 | Frahm .................... | A23G 9/225 220/504 |
| 2,053,935 | A | * | 9/1936 | Austin .................... | A47J 27/04 219/385 |
| 2,501,381 | A | * | 3/1950 | Doblin .................... | A47J 37/07 126/25 R |
| 2,549,440 | A | * | 4/1951 | Ernesto .................. | A47G 19/02 220/23.6 |
| 2,649,966 | A | * | 8/1953 | Johnston .............. | B01D 29/085 210/86 |
| 3,060,919 | A | * | 10/1962 | Shaw ................... | A47J 37/0786 126/25 C |
| 3,129,653 | A | * | 4/1964 | Kertesz ................. | A47J 37/041 99/421 R |

(Continued)

*Primary Examiner* — Jorge A Pereiro
(74) *Attorney, Agent, or Firm* — Schwartz Law Firm, P.C.

(57) ABSTRACT

A grilling insert is adapted for use in a barbecue grill having a recessed cooking chamber. The grilling insert comprises a double-wall thermal barrier and a radiant heat chamber. The double-wall thermal barrier is adapted for extending across the recessed cooking chamber of the barbecue grill, and for dividing the cooking chamber into direct-heating and indirect-heating cooking sections. The radiant heat chamber is formed adjacent the double-wall thermal barrier, and is designed for holding loose combustible material within the direct-heating cooking section of the barbecue grill. The cooking temperature in the direct-heating cooking section is relatively high, and is reduced in the indirect-heating cooking section by the double-wall thermal barrier.

4 Claims, 10 Drawing Sheets

(56) References Cited

U.S. PATENT DOCUMENTS

| | | | |
|---|---|---|---|
| 3,364,844 A * | 1/1968 | Felske | A47J 27/04 99/331 |
| 3,365,071 A * | 1/1968 | Ottinger | A47J 27/04 211/153 |
| 3,967,613 A * | 7/1976 | Rybak | A47J 37/06 126/41 R |
| 4,126,261 A * | 11/1978 | Cook | B65D 5/48024 229/120.08 |
| 4,592,334 A * | 6/1986 | Logan, Jr. | A47J 37/0786 126/25 B |
| D289,964 S * | 5/1987 | Osborne | D7/337 |
| 4,672,944 A * | 6/1987 | Curry | A47J 37/0704 126/25 R |
| D297,115 S * | 8/1988 | Fontana | D9/737 |
| 4,966,125 A | 10/1990 | Stephen et al. | |
| 5,189,945 A * | 3/1993 | Hennick | A47J 37/067 126/25 R |
| 5,367,951 A * | 11/1994 | Purvis | A47J 27/04 99/446 |
| D363,191 S * | 10/1995 | Gibson | D7/402 |
| 5,598,944 A * | 2/1997 | Aragona | A47G 19/06 220/575 |
| D393,798 S * | 4/1998 | Joswick | D9/425 |
| 5,775,570 A * | 7/1998 | Kim | B65D 21/0208 229/4.5 |
| 5,913,966 A * | 6/1999 | Arnone | A47J 36/20 99/413 |
| 5,988,045 A * | 11/1999 | Housley | A47J 27/04 126/20 |
| 6,065,464 A * | 5/2000 | Zajec | A47J 37/0786 126/25 R |
| 6,123,214 A * | 9/2000 | Goebel | B65D 21/0204 206/805 |
| D433,592 S * | 11/2000 | Hopkins | D7/359 |
| 6,155,248 A | 12/2000 | Schlosser et al. | |
| 6,188,046 B1 * | 2/2001 | Barrow | A47J 27/12 219/432 |
| 6,199,718 B1 * | 3/2001 | Ellis | B44D 3/126 220/570 |
| D483,217 S * | 12/2003 | Lara | D7/357 |
| D529,820 S * | 10/2006 | Kissner | D9/737 |
| 7,331,278 B2 * | 2/2008 | Stokes, Jr. | A47J 37/0786 99/401 |
| 7,832,330 B1 | 11/2010 | Thompson | |
| D651,457 S * | 1/2012 | Borovicka | D7/402 |
| D669,368 S * | 10/2012 | Ehrmann | D9/737 |
| 8,302,528 B2 * | 11/2012 | Pawlick | B65D 25/24 99/448 |
| 8,445,043 B2 * | 5/2013 | Jackson | B65D 81/3453 426/107 |
| 8,474,641 B2 * | 7/2013 | Hays | B65D 81/18 220/23.89 |
| 8,850,964 B2 * | 10/2014 | Pawlick | A47J 27/16 99/336 |
| 9,145,233 B2 * | 9/2015 | Cerrato | B65D 25/04 |
| 9,211,030 B2 * | 12/2015 | France | A47J 27/16 |
| 9,215,949 B1 * | 12/2015 | Cloutier | A47J 37/0694 |
| D761,511 S * | 7/2016 | Malvasio | D32/53.1 |
| D777,583 S * | 1/2017 | Liming | D9/715 |
| D777,584 S * | 1/2017 | Liming | D9/715 |
| 9,681,775 B2 * | 6/2017 | Contarino, Jr. | F24B 1/207 |
| 9,867,383 B2 * | 1/2018 | Borovicka | A23B 4/0523 |
| 2003/0037682 A1 * | 2/2003 | Dzbinski | A47J 36/20 99/422 |
| 2004/0083904 A1 * | 5/2004 | Wei-Wen | A47J 27/04 99/448 |
| 2008/0163765 A1 * | 7/2008 | O'Shea | A47J 37/0713 99/482 |
| 2010/0108560 A1 * | 5/2010 | Macarthur-Onslow | A47G 19/065 206/561 |
| 2010/0108686 A1 * | 5/2010 | Reichel | B65D 21/0233 220/556 |
| 2010/0282636 A1 * | 11/2010 | Roberts | B65D 81/3216 206/561 |
| 2011/0120442 A1 * | 5/2011 | Duncan | A47J 37/0786 126/25 R |
| 2013/0213243 A1 | 8/2013 | Borovicka | |
| 2013/0277375 A1 * | 10/2013 | Hickox | A47G 23/06 220/575 |
| 2016/0106261 A1 * | 4/2016 | Cloutier | A47J 37/0694 99/425 |

\* cited by examiner

BARBECUE GRILL ACCESSORY AND METHOD FOR PREPARING FOOD

TECHNICAL FIELD AND BACKGROUND OF THE DISCLOSURE

The present disclosure relates broadly and generally to a barbecue grill accessory and method for preparing food. In one exemplary embodiment, the invention is applicable for use in conventional barbecue grills, and functions to enable a variety of meat grilling techniques including slow smoking and fast hot searing.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a grilling insert adapted for use in a barbecue grill having a recessed cooking chamber. The grilling insert comprises a double-wall thermal barrier and a radiant heat chamber (e.g., "charcoal basket"). The double-wall thermal barrier is adapted for extending across the recessed cooking chamber of the barbecue grill, and for dividing the cooking chamber into direct-heating and indirect-heating cooking sections. The radiant heat chamber is formed adjacent the double-wall thermal barrier, and is designed for holding loose combustible material within the direct-heating cooking section of the barbecue grill. The cooking temperature in the direct-heating cooking section is relatively high, and is reduced in the indirect-heating cooking section by the double-wall thermal barrier.

The term "barbecue grill" refers broadly herein to any device that cooks food by applying heat from below.

According to another exemplary embodiment, the thermal barrier comprises a chordal water reservoir designed to extend from one point on a circular interior of the recessed cooking chamber to an opposite point.

According to another exemplary embodiment, the chordal water reservoir has a substantially V-shaped cross-section.

According to another exemplary embodiment, the chordal reservoir is designed to hold between 16 and 48 ounces of water.

According to another exemplary embodiment, the radiant heat chamber is defined by at least one solid peripheral wall joined at opposite ends of the chordal water reservoir, such that the radiant heat chamber and chordal water reservoir combine to form a single integrated unit.

According to another exemplary embodiment, the peripheral wall of the radiant heat chamber is substantially arcuate.

According to another exemplary embodiment, the peripheral wall of the radiant heat chamber comprises a substantially tapered lateral surface.

According to another exemplary embodiment, the radiant heat chamber defines an open bottom.

According to another exemplary embodiment, the recessed cooking chamber of the barbecue grill is generally semi-spherical.

In another exemplary embodiment, the present disclosure comprises a method for barbequing. The method includes placing a grilling insert within a recessed cooking chamber of a barbecue grill. The grilling insert comprises a double-wall thermal barrier extending across the recessed cooking chamber, and dividing the cooking chamber into direct-heating and indirect-heating cooking sections. A loose combustible material is added to the direct-heating cooking section of the barbecue grill. The loose combustible material is then ignited. A food product is then cooked by one or both of the following steps: (i) placing the food product on a grid within the direct-heating cooking section above the ignited combustible material, or (ii) placing the food product on a grid within the indirect-heating cooking section above the ignited combustible material.

According to another exemplary embodiment, the method comprises adding water to the double-wall thermal barrier.

According to another exemplary embodiment, the loose combustible material comprises one or more briquettes. The term "briquette" refers broadly to a compressed block of coal dust or other combustible material. Exemplary briquettes may comprise any one or combination of biomass materials such as charcoal, sawdust, wood chips, peat, or paper. In other embodiments, the loose material may comprise ceramic briquettes and tiles, lava rock, lava cinders, and/or lava stone.

BRIEF DESCRIPTION OF THE DRAWINGS

Exemplary embodiments of the present disclosure will hereinafter be described in conjunction with the following drawing figures, wherein like numerals denote like elements, and wherein.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
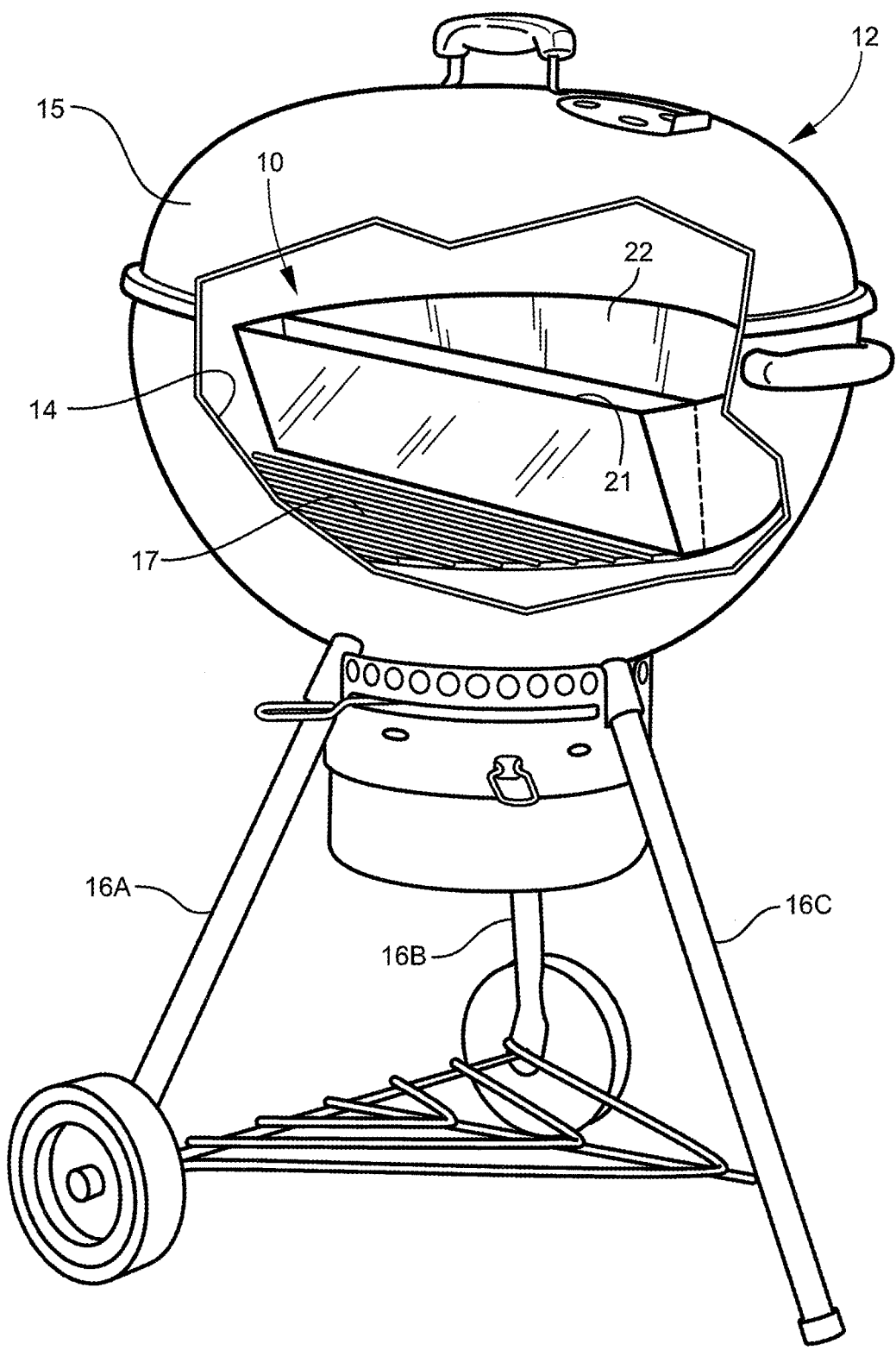
FIG. 1 is an environmental perspective view of an exemplary grilling insert located within the cooking chamber of a conventional kettle-style barbecue grill with portions of the grill cover and chamber broken away.
Figure 2:
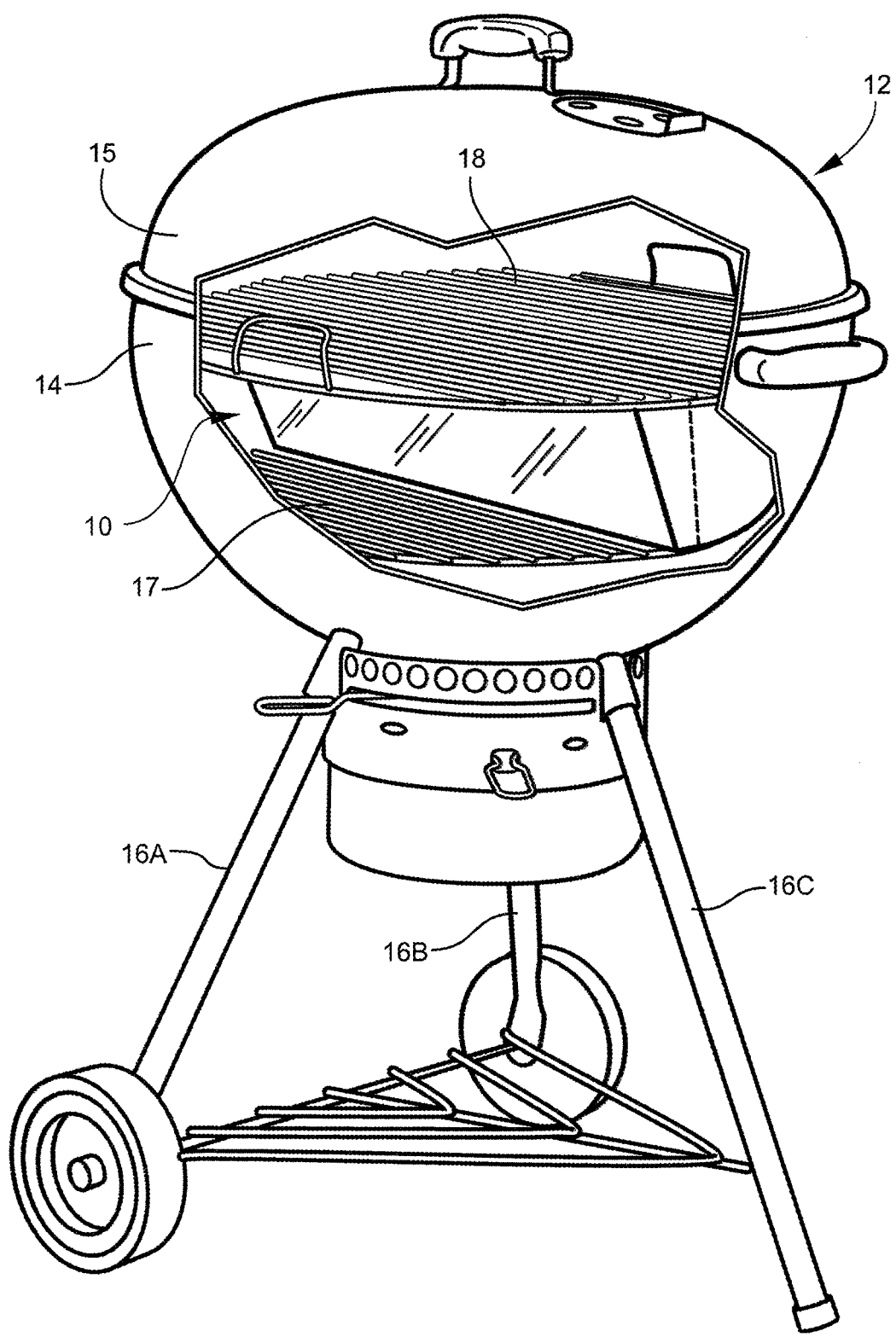
FIG. 2 is a further environmental perspective view of the exemplary grilling insert located within the cooking chamber of the grill.
Figure 3:
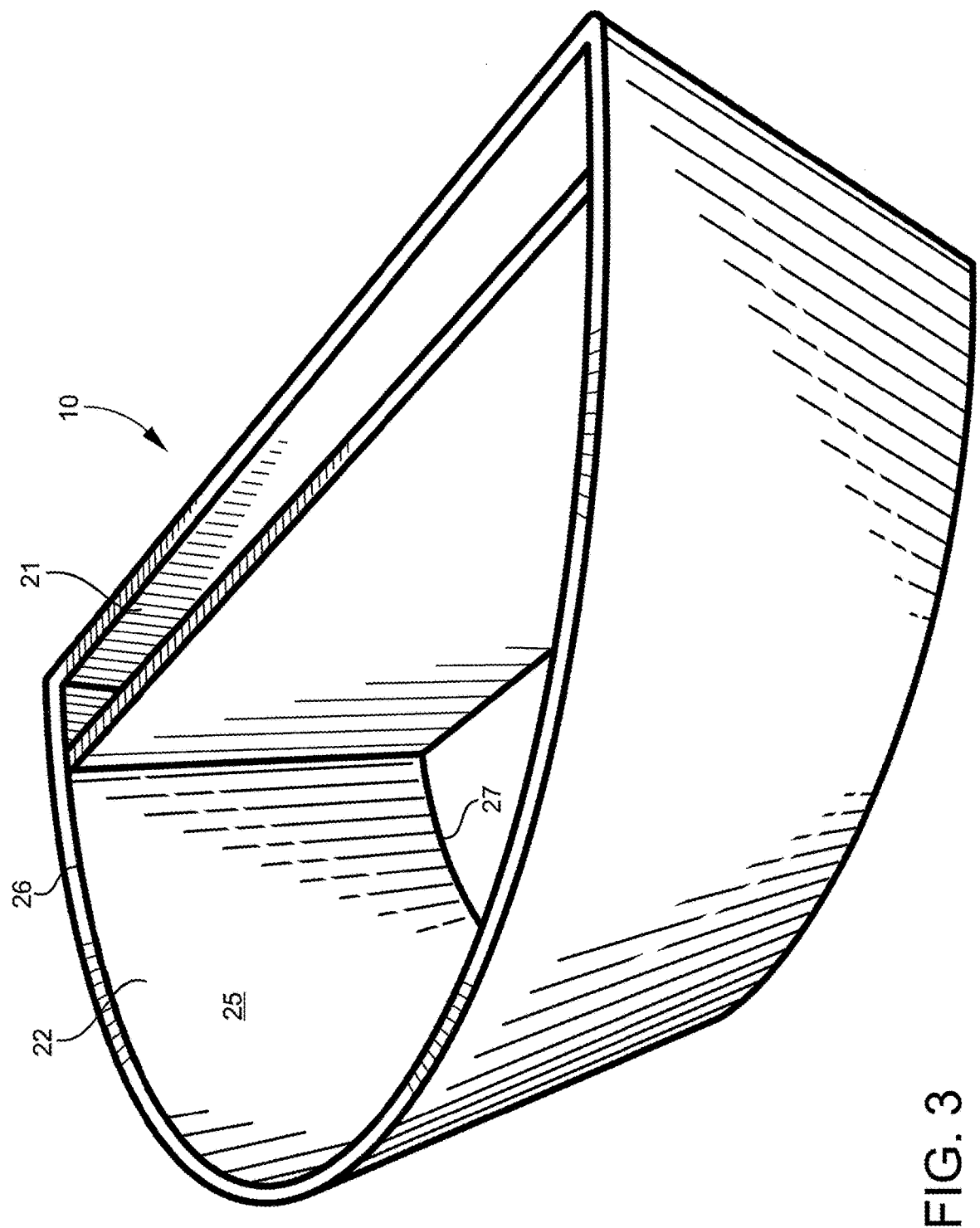
FIG. 3 is a top perspective view of the exemplary grilling insert.
Figure 4:
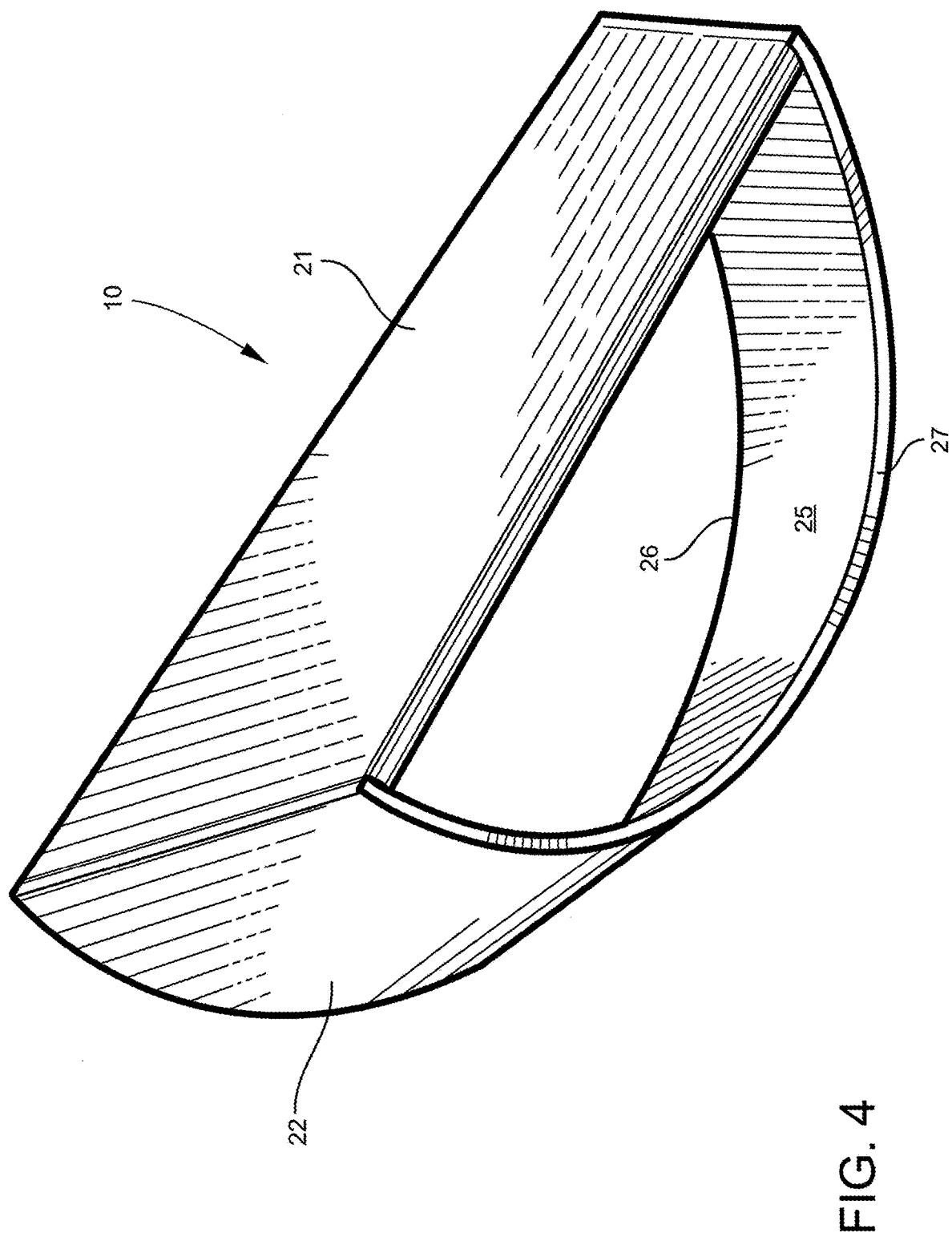
FIG. 4 is a bottom perspective view of the exemplary grilling insert.
Figure 5:
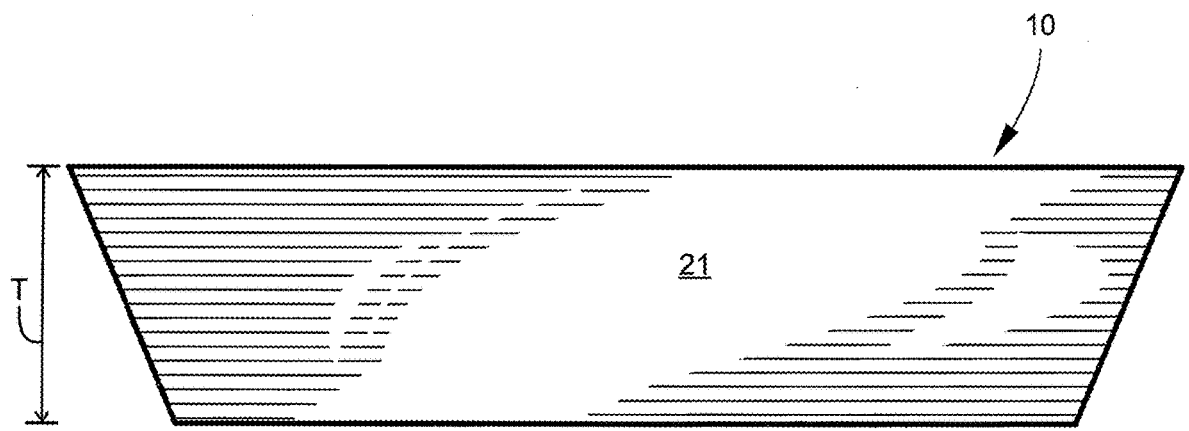
FIG. 5 is a rear end view of the exemplary grilling insert.
Figure 6:
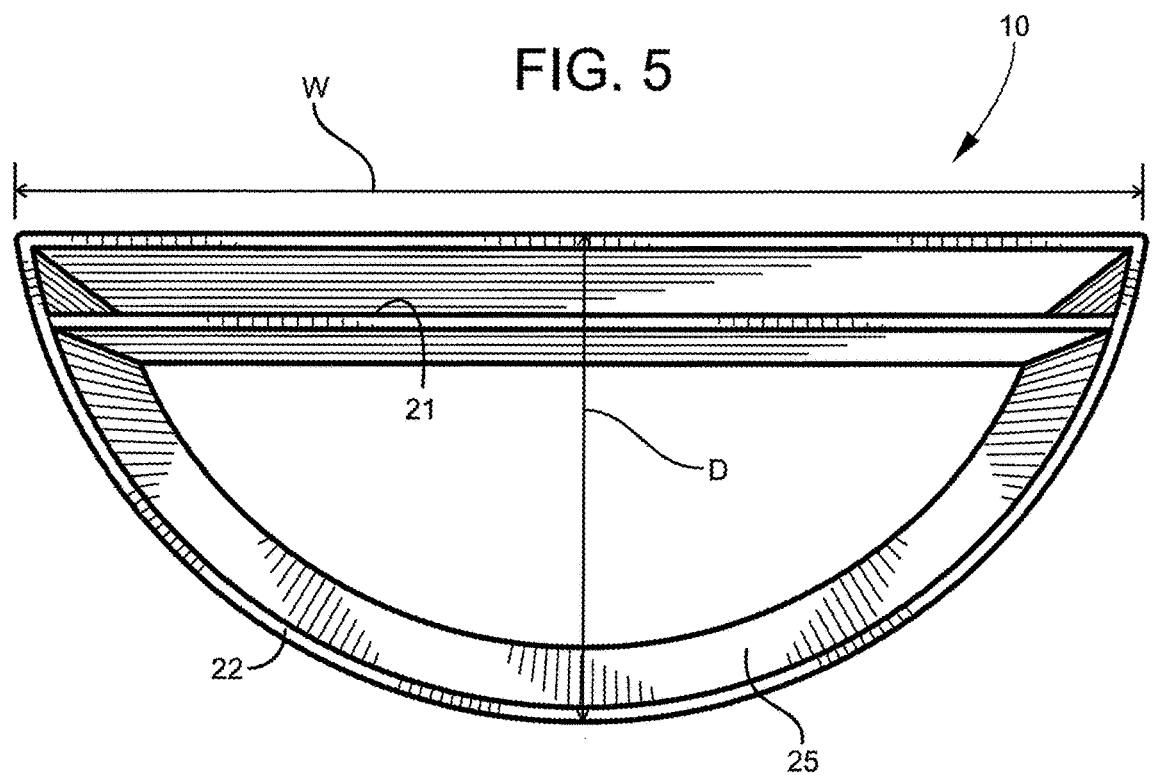
FIG. 6 is a top view of the exemplary grilling insert.
Figure 7:
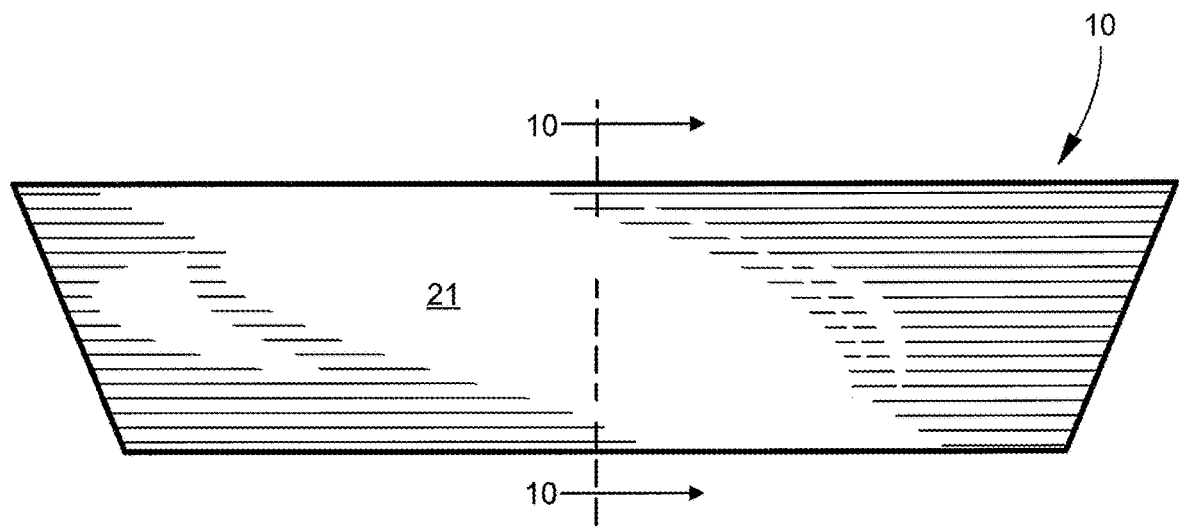
FIG. 7 is a front view of the exemplary grilling insert.
Figure 8:
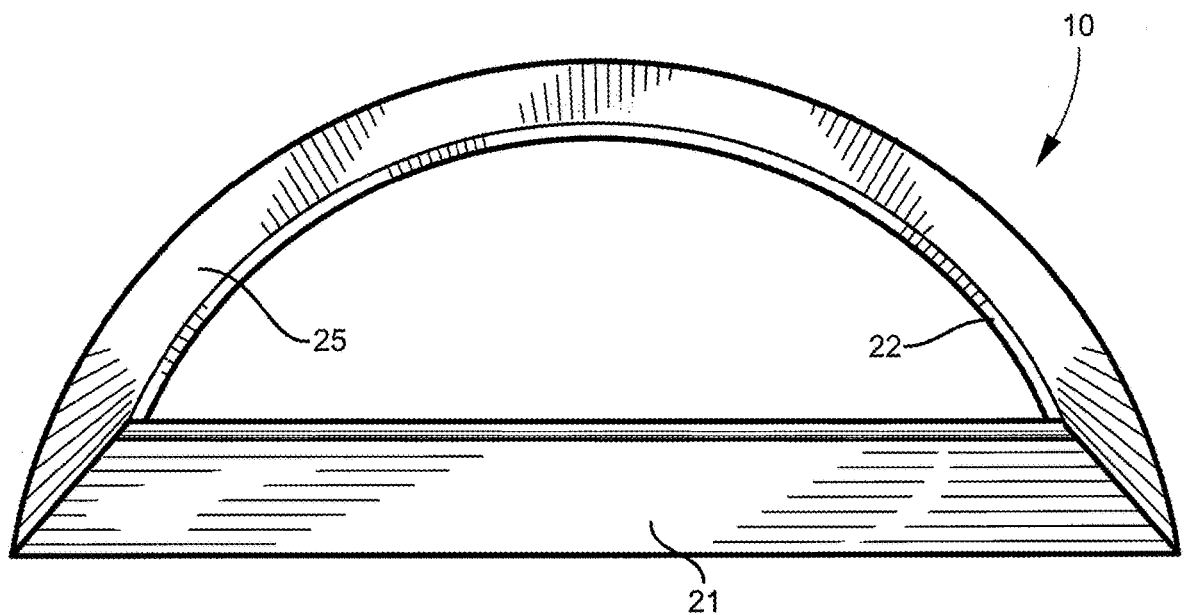
FIG. 8 is a bottom view of the exemplary grilling insert.
Figure 9:
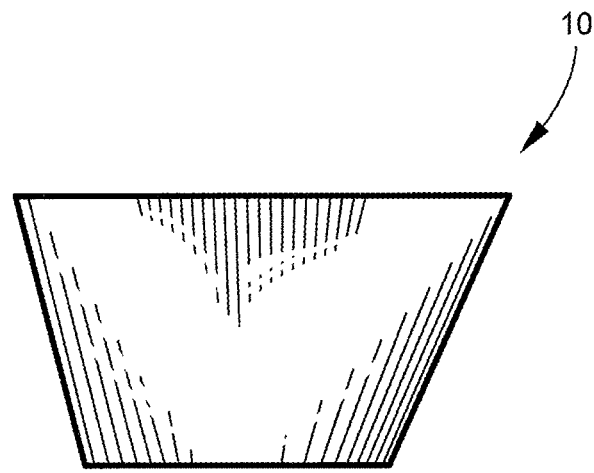
FIG. 9 is a side view of the exemplary grilling insert.
Figure 10:
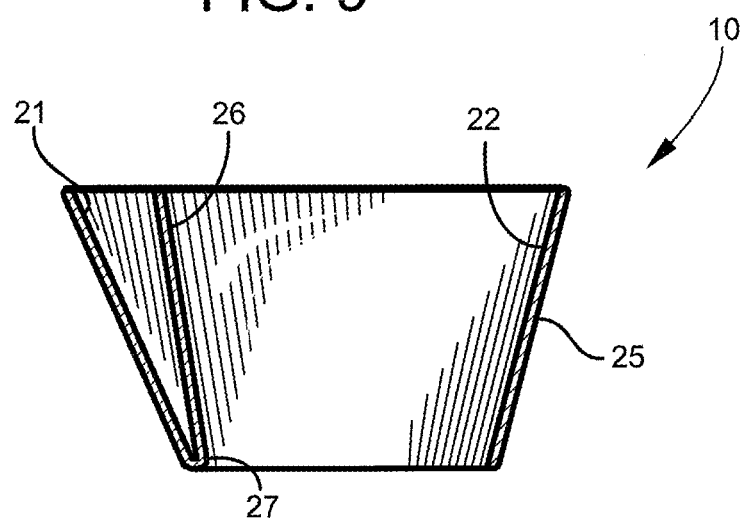
FIG. 10 is a cross-sectional view of the exemplary grilling insert taken substantially along line 10-10 of FIG. 7.

Referring now specifically to the drawings, a grilling insert according to one exemplary embodiment of the present disclosure is illustrated in FIGS. 1 and 2, and shown generally at broad reference numeral 10. The exemplary grilling insert 10 is designed for use in a barbecue grill 12, such as the 22" or 26" Weber® kettle grill sold commercially by Weber-Stephen Products LLC. An example of one such grill is described in prior U.S. Pat. No. 4,416,248. The complete disclosure of this patent is incorporated herein by reference. Like conventional kettle grills, the exemplary barbecue grill 12 comprises a bottom bowl-shaped cooking chamber 14 (e.g., "kettle") and venting system, a removable vented cover 15, and a supporting frame with spaced-apart vertical legs 16A, 16B, 16C for elevating the grill above the ground. A lower metal grate 17 is located inside the cooking chamber 14 and spaced a short distance above the chamber bottom. A removable metal cooking grid 18 is supported above the lower grate 17, and serves to hold the food being cooked inside the cooking chamber 14.

In one exemplary application shown in FIGS. 1 and 2, the present grilling insert 10 is placed on the lower grate 17 below the cooking grid 18, and comprises a double-wall water reservoir 21 and an open bottom radiant heat chamber 22 (or "charcoal chamber"). The heat chamber 22 defines a flow-through "basket" for receiving and holding charcoal briquettes or other loose combustible material between the lower grate 17 and cooking grid 18.

Referring to FIGS. 3-10, the water reservoir 21 and radiant heat chamber 22 of the exemplary grilling insert 10 are integrally formed together as a single homogenous unit, and may be fabricated of stainless steel or other suitable metal. In one embodiment, the grilling insert 10 is constructed from about 5 lbs of 16 gauge (0.060-inch) stainless steel. The exemplary water reservoir 21 has a substantially V-shaped cross-section, best shown in FIG. 10, and is designed to extend chordally from one point "P1" on a circular interior of the recessed cooking chamber 14 to an opposite point "P2" (See FIG. 11). The water reservoir 21 of the grilling insert 10 is sealed to hold between about 16 and 48 ounces of water; and more specifically, about 32 ounces in one exemplary design. The radiant heat chamber 22 is formed by a solid arcuate peripheral wall 25 integrally joined by welding (or other suitable means) to opposite ends of the chordal water reservoir 21. The peripheral wall 25 has a substantially tapered lateral surface which cooperates with the water reservoir 21 to define a relatively large open top 26 and relatively small open bottom 27 of the heat chamber 22. The opening formed at the open top 26 of heat chamber 22 may be 20%-30% larger than the opening formed at the open bottom 27. In one exemplary embodiment, the grilling insert 10 is 21-inches wide measured from edge to edge of the water reservoir 21, as indicated at "W" in FIG. 6; 8.5-inches deep measured from a farthest edge of heat chamber 22 to the outer wall of water reservoir 21, as indicated at "D" in FIG. 6; and 4.75-inches tall, as indicated at "T" in FIG. 5. In alternative embodiments, the radiant heat chamber 22 does not include a peripheral wall 25, but instead cooperates with a side wall of the barbecue grill 12 and a near wall of the water reservoir 21 to form a radiant heat zone therebetween.

Figure 11:
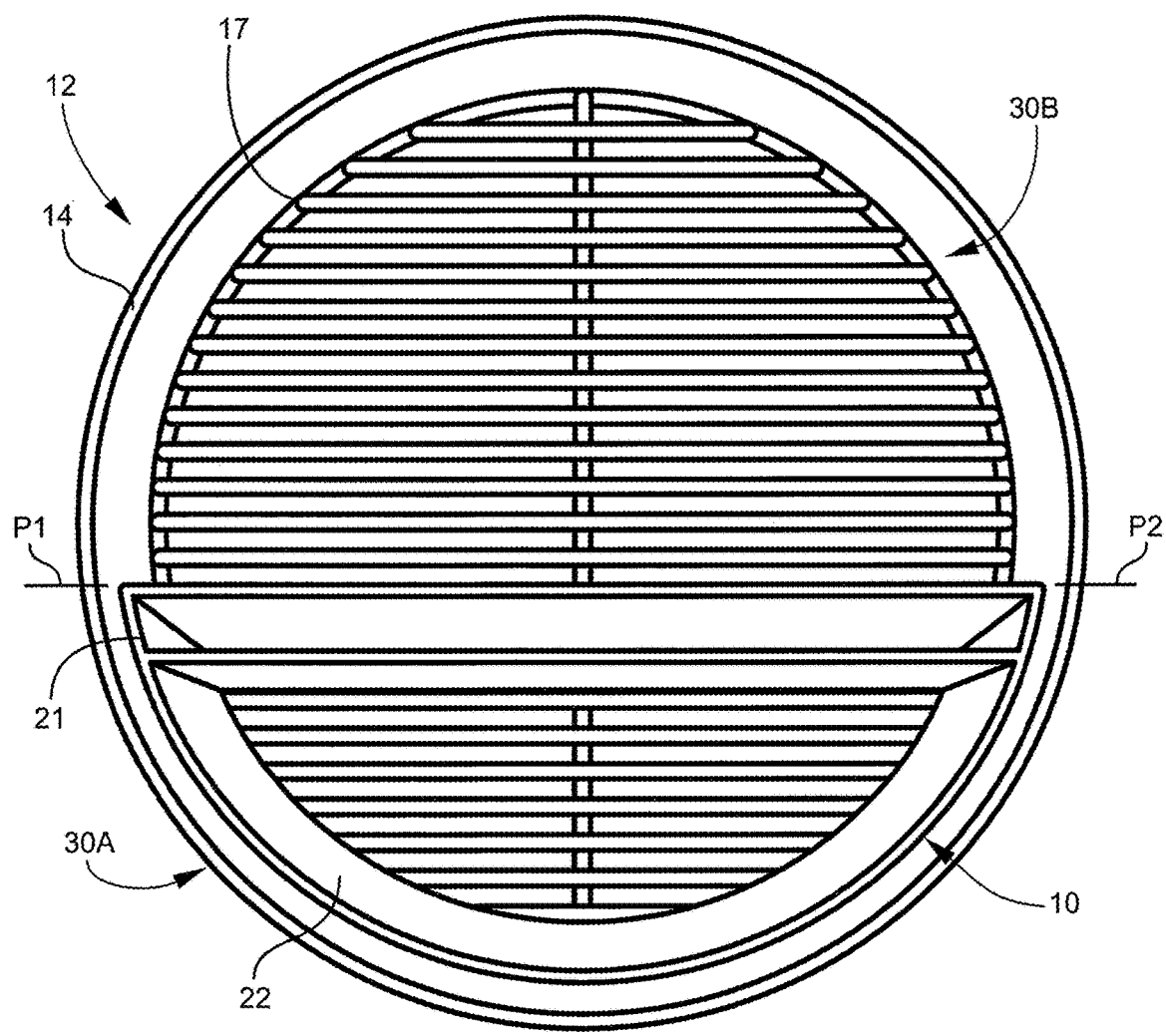
FIG. 11 is top plan view of the barbecue grill with the exemplary grilling insert positioned on the lower grate adjacent the grill wall.
Figure 12:
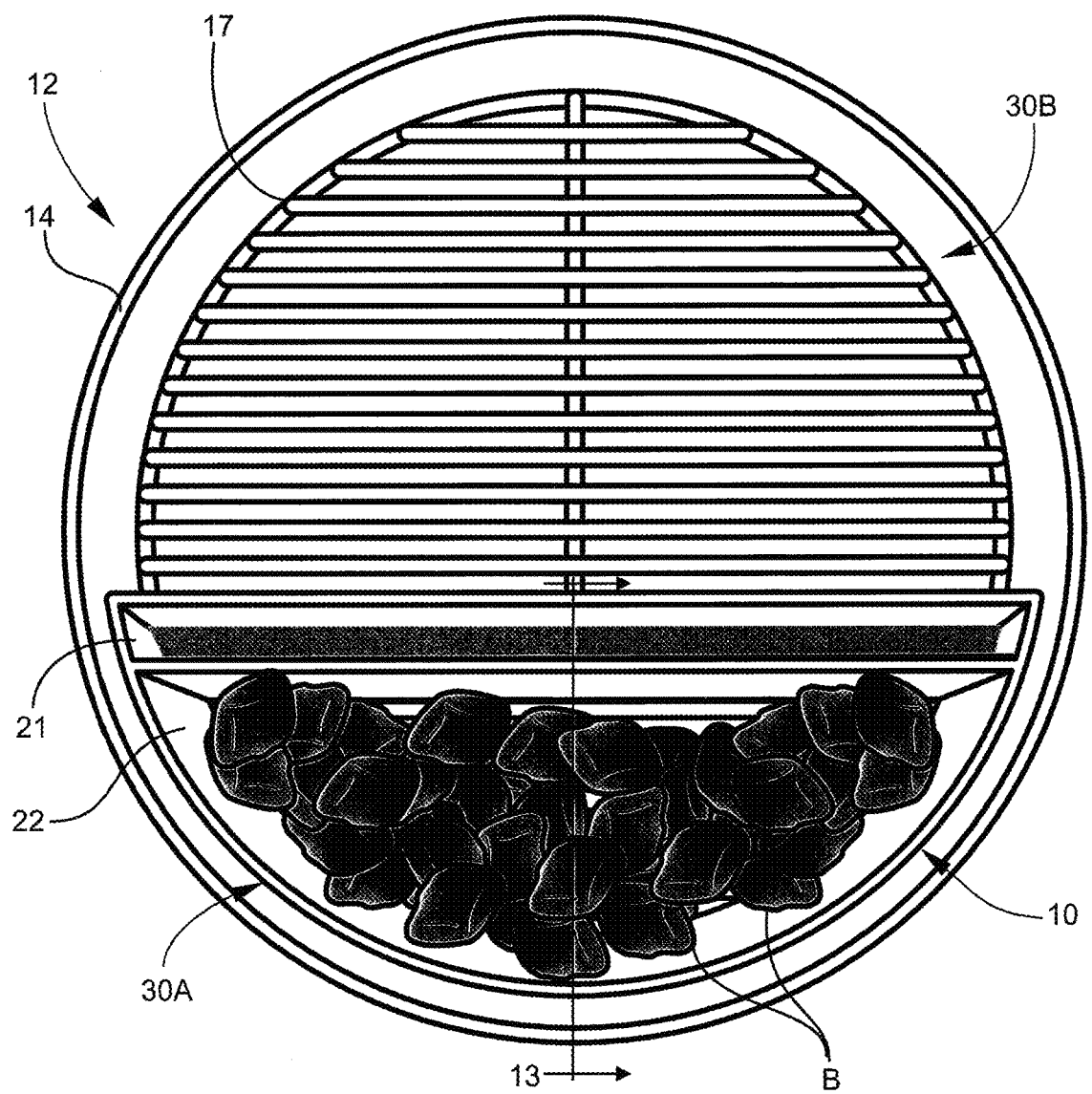
FIG. 12 shows the grilling insert positioned in the barbecue grill with water inside the water reservoir and charcoal briquettes inside the heat chamber.
Figure 13:
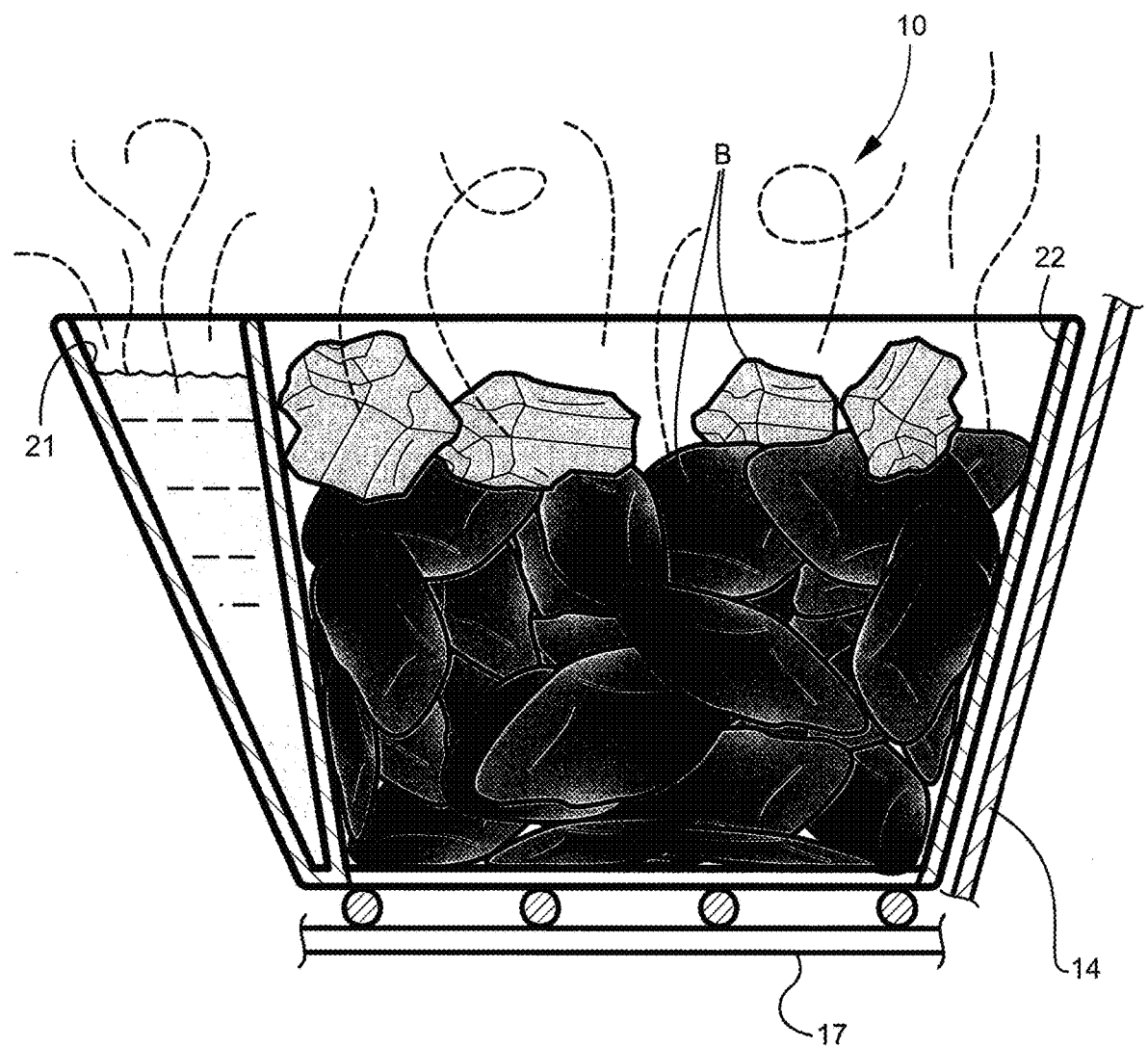
FIG. 13 is a cross-sectional view taken substantially along line 13-13 of FIG. 12.

As best shown in FIGS. 11, 12, and 13, the chordal water reservoir 21 (whether filled or empty) defines a double-wall V-shaped thermal barrier designed to extend across the recessed cooking chamber 14 of the barbecue grill 12, and dividing the cooking chamber 14 into direct-heating and indirect-heating cooking sections 30A and 30B. The radiant heat chamber 22 resides directly adjacent the thermal barrier formed by water reservoir 21, and is designed for holding charcoal briquettes (or other loose combustible material) within the direct-heating cooking section 30A of the barbecue grill 12. The tapered or concave design of the heat chamber 22 holds the briquettes away from the side wall of the grill 12, thereby reducing the amount of heat loss through the grill's outside surface, and nestles the briquettes close together for a more efficient burn. The exemplary heat chamber 22 may be designed to hold about 80-100 standardsize briquettes, such as those manufactured and sold by Kingsford Products Company. The cooking temperature in the direct-heating cooking section 30A of the grill 12 is intended to be relatively high (e.g., 300 to 1000 degrees F. or more), and is reduced (e.g., 225 degrees F. or less) in the indirect-heating cooking section 30B by the thermal barrier formed by water reservoir 21. For example, the direct-heating cooking section 30A of the grill 12 may be 40-70% hotter as compared to the indirect-heating cooking section 30B.

For indirect cooking, described further below, the charcoal briquettes may be piled inside the heat chamber 22 of the grilling insert 10 and water poured into the water reservoir 21. The generally V-shaped design of the water reservoir 21 concentrates heat at the bottom, thereby boiling water consistently and slowly. After igniting the briquettes and heating the water, food is placed within the indirect-heating cooking section 30B of the barbecue grill 12 for cooking. One quart of water poured in the water reservoir 21 may provide a steady steam for 5+ hours, thus enhancing the flavor and tenderness of smoked meats. Together, the water reservoir 21 and heat chamber 22 of grilling insert 10 combine to provide improved temperature control and stability—maintaining consistent temperatures (e.g., 225 degrees F.) for 10 or more hours of cooking with little to no vent adjustment.

Exemplary Grilling Techniques: Low and Slow

Referring to FIGS. 1, 2 and 11-13, the present grilling insert 10 may be used in a barbecue grill (e.g., grill 12) for a long 10+ hour cook at relatively low temperatures—225 degree F. or less. According to this process, the grilling insert 10 may be utilized as follows:

1. Remove the cover 15 and cooking grid 18 of the barbecue grill 12 (See FIGS. 1 and 2), and place the grilling insert 10 on the lower grate 17 such that the tapered wall of the heat chamber 22 resides closely adjacent the side wall 32 of the cooking chamber 14, as best shown in FIG. 13.

2. Place a chimney starter cube on a small square tube of foil near one corner of the radiant heat chamber 22.

3. After lighting the starter cube, add a number of charcoal briquettes "B" (roughly a dozen) around and on top of the starter cube, with the briquettes tucked fairly tight into the corner of the heat chamber 22. Leave the cover 15 off of the grill 12, and open the bottom vents. Make sure any ash from previous grilling is cleaned out to allow for good airflow, as the starter cube may snuff out without proper airflow.

4. Wait about 10-15 minutes, or until the smoke dies down and the coals are well lit.

5. Then, add a full chimney of unlit charcoal briquettes (70-80 briquettes) to fill the remainder of the heat chamber 22 of grilling insert 10. Optionally, add a few chunks of smoking wood spread out over the top of the briquettes.

6. Add about 1 quart of hot water to the water reservoir 21 of the grilling insert 10, pouring from the unlit side of the heat chamber 22.

7. Replace the cooking grid 18 over the grilling insert 10, and place a leave-in digital thermometer probe on the indirect heating side (cooking side) 30B, opposite the grilling insert 10 at or just above grid level.

8. Place the cover 15 on the grill 12 securely with the cover vent positioned opposite the grilling insert 10. This will help draw the hot air over the cooking grid 18 and meat.

9. Open the top vent fully and the bottom vent about halfway. The temperature will slowly rise as the grill 12, its components, and the water in the reservoir 21 begin to heat up. When the temperature at grid level reaches about 150 to 175 degrees F., close the top vent to about ⅓ open and the bottom vent to about ¼ open.

10. Place meat on the cooking grid 18, and continue to monitor the temperature as it nears 225 and close the top vent as needed to hold 225.

Exemplary Grilling Techniques: Hot and Fast

Referring again to FIGS. 1, 2 and 11-13, in other applications, the present grilling insert 10 may be used in a barbecue grill (e.g., grill 12) for a shorter and hotter cook or sear within the direct-heating cooking section 30A at temperatures ranging from 300 to 1000 degrees F. or more. The tapered heat chamber 22 of the grilling insert 10 is designed to collect and focus the searing radiant heat upward into the food, producing a Maillard reaction responsible for the browning and flavor of the seared meat.

According to this exemplary process, the grilling insert 10 may be utilized as follows:

1. Remove the cover 15 and cooking grid 18 of the barbecue grill 12 (FIGS. 1 and 2), and place the grilling insert 10 on the lower grate 17 such that the tapered wall of the heat chamber 22 resides closely adjacent the side wall 32 of the cooking chamber 14, as best shown in FIG. 13.

2. Add about 40 charcoal briquettes "B" (about ½ a chimney) to the heat chamber 22 of the grilling insert 10.

3A. Light the briquettes "B" and allow them to burn for approximately 10 minutes, and spread evenly over the lower grate 17 within the heat chamber 22 of grilling insert 10.

3B. For a longer hotter cook, add about 40 unlit briquettes "B" to the heat chamber 22 of grilling insert 10, then add the well-lit briquettes on top.

4. Replace the cooking grid 18 over the grilling insert 10, and place a leave-in digital thermometer probe on the direct heating side at or just above grid level.

5. Place the cover 15 on the grill 12 securely with the cover vent positioned opposite the grilling insert 10. This will help draw the hot air over the cooking grid and meat.

6. Fully open the top and bottom vents of the barbecue grill 12, and allow the temperature to rise to approximately 275 degrees F. When reaching this temperature, close the top vent to about ⅓ open and the bottom vent to about ¼ open.

7. Use the venting system of the grill 12 to hold the temperature with a range of about 325 to 350 degrees F.

8. Place meat on the cooking grid 18 for searing.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. A grilling insert adapted for use in a barbecue grill having a recessed cooking chamber, said grilling insert comprising:
  a double-wall thermal barrier designed to extend between opposite points within an interior of the recessed cooking chamber, and said thermal barrier forming a direct-heating cooking section on a first side of said thermal barrier and an indirect-heating cooking section on a second side of said thermal barrier, and wherein said thermal barrier has a generally V-shaped vertical cross-section, and is formed by cooperating spaced-apart interior and exterior walls; and
  a radiant heat chamber adjacent said thermal barrier, and designed for holding loose combustible material within the direct-heating cooking section, such that cooking temperature in the direct-heating cooking section is relatively high, and is reduced in the indirect-heating cooking section by said double-wall thermal barrier, and wherein said radiant heat chamber is formed by the interior wall of said thermal barrier and a vertical downwardly tapered peripheral wall curving between opposite ends of said thermal barrier and designed to reside proximate an interior surface of the barbecue grill, and said peripheral wall cooperating with the interior wall of said thermal barrier to define a relatively large open top of said heat chamber and a comparatively small bottom of said heat chamber.

2. The grilling insert according to claim 1, wherein said thermal barrier defines a chordal reservoir designed to hold between 16 and 48 ounces of water.

3. The grilling insert according to claim 1, wherein said peripheral wall of said radiant heat chamber is joined at opposite ends of said chordal water reservoir, such that said radiant heat chamber and chordal water reservoir combine to form a single integrated unit.

4. The grilling insert according to claim 1, wherein said radiant heat chamber defines an open bottom.

* * * * *